(12) United States Patent
Liu

(10) Patent No.: US 8,306,729 B2
(45) Date of Patent: Nov. 6, 2012

(54) NAVIGATION SYSTEM WITH USER GENERATED CONTENT MECHANISM AND METHOD OF OPERATION THEREOF

(75) Inventor: Winston Yonglong Liu, San Jose, CA (US)

(73) Assignee: TeleNav, Inc., Sunnyvale, CA (US)

( * ) Notice: Subject to any disclaimer, the term of this patent is extended or adjusted under 35 U.S.C. 154(b) by 493 days.

(21) Appl. No.: 12/578,158

(22) Filed: Oct. 13, 2009

(65) Prior Publication Data
US 2011/0087427 A1   Apr. 14, 2011

(51) Int. Cl.
*G05F 7/00* (2006.01)
(52) U.S. Cl. .......................... 701/400; 380/30
(58) Field of Classification Search .............. 701/400, 701/408, 425; 380/30; 715/810; 717/168, 717/172–174
See application file for complete search history.

(56) References Cited

U.S. PATENT DOCUMENTS

| | | | |
|---|---|---|---|
| 6,397,332 B2 | 5/2002 | Kawano et al. | |
| 7,552,335 B2 * | 6/2009 | Iwamura | 713/176 |
| 7,913,192 B2 * | 3/2011 | Dicke et al. | 715/864 |
| 2005/0278386 A1 * | 12/2005 | Kelly et al. | 707/200 |
| 2006/0173614 A1 | 8/2006 | Nomura | |
| 2007/0244634 A1 | 10/2007 | Koch et al. | |
| 2008/0010319 A1 | 1/2008 | Vonarburg et al. | |
| 2008/0040026 A1 | 2/2008 | Hui | |
| 2008/0065325 A1 | 3/2008 | Geelen et al. | |
| 2008/0082381 A1 | 4/2008 | Muller et al. | |
| 2008/0109369 A1 | 5/2008 | Su et al. | |
| 2008/0307053 A1 | 12/2008 | Mitnick et al. | |
| 2009/0100018 A1 | 4/2009 | Roberts | |

OTHER PUBLICATIONS

International Search Report for Application No. PCT/US2010/052568 dated Nov. 30, 2010.

* cited by examiner

*Primary Examiner* — Dalena Tran
(74) *Attorney, Agent, or Firm* — Ishimaru & Associates LLP; Mikio Ishimaru; Stanley M. Chang

(57) ABSTRACT

A method of operation of a navigation system includes: receiving a change request with a proposed change for an item; verifying a validity of the change request based on a confidence level meeting or exceeding a change threshold; and updating a target element of the item based on the validity of the proposed change for avoiding an incorrect update to the target element for displaying on a device.

18 Claims, 8 Drawing Sheets

NAVIGATION SYSTEM WITH USER GENERATED CONTENT MECHANISM AND METHOD OF OPERATION THEREOF

TECHNICAL FIELD

The present invention relates generally to a navigation system, and more particularly to a system for navigation system with user generated content.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

As users adopt mobile location-based service devices, new and old usage begin to take advantage of this new device space. There are many solutions to take advantage of this new device opportunity. One existing approach is to use location information to provide navigation services, such as a global positioning service (GPS) navigation system for a mobile device.

Navigation system and service providers are continually making improvement in the user's experience in order to be competitive. In navigation services, demand for better usability by providing additional information is increasingly important. To provide additional information, some navigation systems and services allow the creation and distribution of user generated content (UGC). UGC can include information entered by users to supplement what is provided by the service provider.

UGC can include a wide variety of useful information. For example, UGC can include information about a point of interest. Information could include a point of interest for a restaurant and include information such address, phone number, menu items, ratings, or any combination thereof. The creation and editing of UGC is generally unregulated and uncontrolled, so UGC must be verified and validated in terms of accuracy before being fully accepted and distributed in the navigation system. Because of the large amount of UGC created by users, an automated verification method is an important, yet challenging task.

The volume of UGC is constantly increasing as more systems allow users to create and edit new content. As the amount of UGC grows, the need to verify and validate the UGC grows as well. New methods for increasing the performance and capacity of automatic UGC verification are needed.

In response to consumer demand, navigation systems are providing ever-increasing amounts of information requiring these systems to improve usability, performance, and accuracy. This information includes map data, business data, local weather, and local driving conditions. The demand for more information and the need to provide user-friendly experience, low latency, and accuracy continue to challenge the providers of navigation systems.

Thus, a need still remains for a navigation system to provide user generated content verification with improvement in usability, performance, and accuracy. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a change request with a proposed change for an item; verifying a validity of the change request based on a confidence level meeting or exceeding a change threshold; and updating a target element of the item based on the validity of the proposed change for avoiding an incorrect update to the target element for displaying on a device.

The present invention provides a navigation system including: a controller interface for receiving a change request; a verify change request module, coupled to the controller interface, for verifying the change request of an item based on the validity of the proposed change for avoiding an incorrect update to the target element; and an update item module, coupled to the controller interface, for updating the target element of the item based on the validity of the proposed change for avoiding an incorrect update to the target element.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
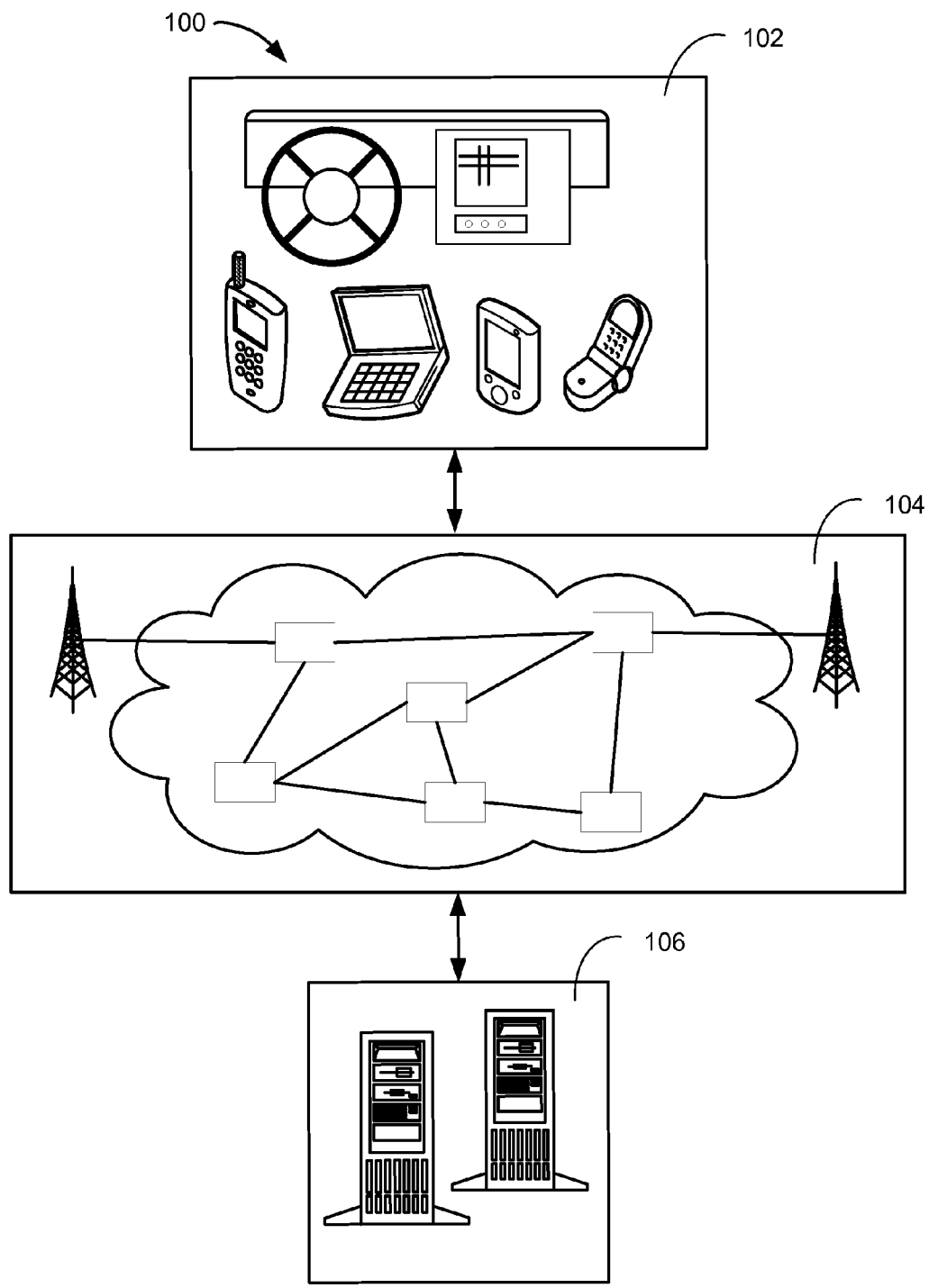
FIG. 1 is a navigation system with UGC verification in a first embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "User Generated Content" (UGC) referred to herein is defined as the routing information described as well as information relating to points of interest to the user, such as local business, hours of businesses, types of businesses, advertised specials, traffic information, maps, local events, and nearby community or personal information.

Referring now to FIG. 1, therein is shown is a navigation system 100 with UGC verification in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

Figure 2:
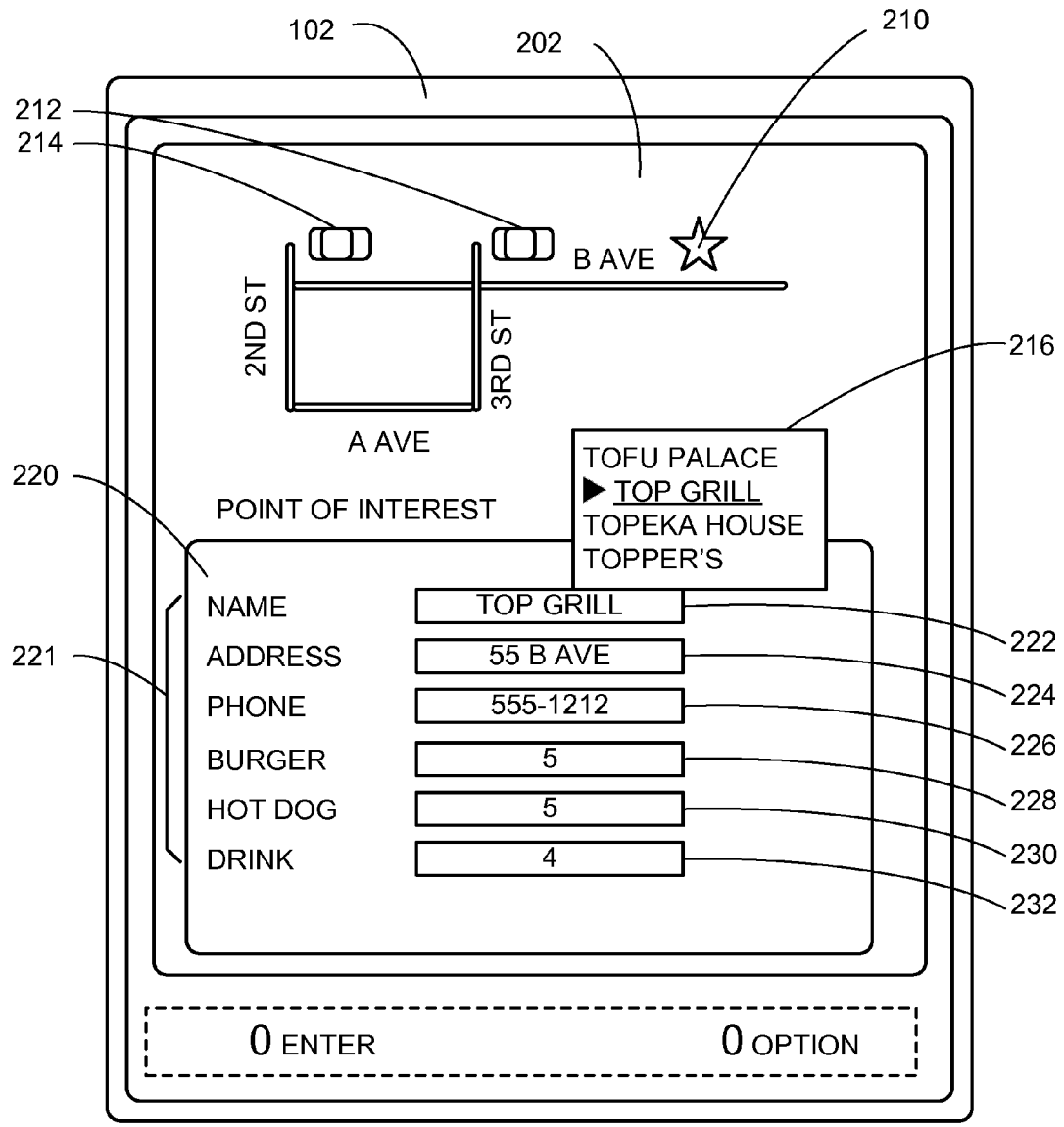
FIG. 2 is a first example of a display interface of the first device.

Referring now to FIG. 2, therein is shown a first example of a display interface 202 of the first device 102. The display interface 202 can show where a user attempts to create or update content, such as information about a point of interest 210. The user can create a change request 220 that can include new values for existing information associated with the point of interest 210.

For example, the point of interest 210 can be selected from an item list 216. The item list 216 can represent a list containing the point of interest 210 that can be displayed and the point of interest 210 selected by the user. The point of interest 210 can represent a restaurant, "Top Grill", that has associated information elements 221. The associated information elements 221 can describe pieces of user generated content about the point of interest 210. The associated information elements 221 can include a name 222, an address 224, a phone number 226, a burger rating 228, a hot dog rating 230, a drink rating 232, or any combination thereof.

In a further example, the change request 220 can have different field depending on different types of content, such as province or townships or unit number. The display interface 202 depicts the change request 220 represented by data entry fields where new information can be entered. The display interface 202 can depict a previous location 212 and a current location 214 of the user.

Figure 3:
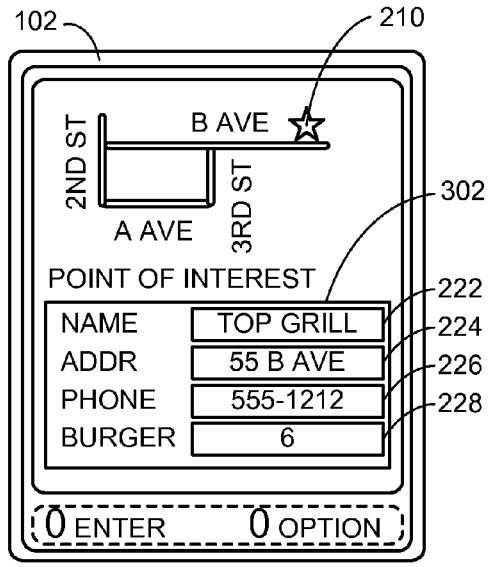
FIG. 3 is a second example of the display interface.

Referring now to FIG. 3, therein is shown a second example of the display interface 202. The display interface 202 can depict a first change request entry 302 representing a change to the burger rating 228 to 6.

The first change request entry 302 can represent a potential modification of the burger rating 228 from 5 to 6. Because the total number of changes to the burger rating 228 of 5 is only one, the navigation system 100 of FIG. 1 can elect not verify the change of the burger rating 228. The details of verification are described later.

Figure 4:
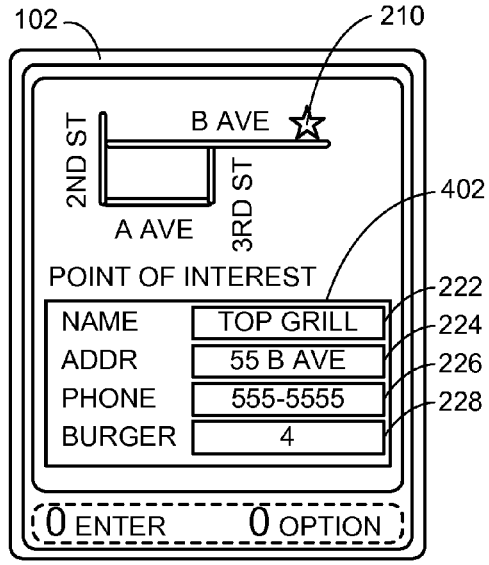
FIG. 4 is a third example of the display interface.

Referring now to FIG. 4, therein is shown a third example of the display interface 202. The display interface 202 can depict a second change request entry 402 representing different change to the burger rating 228 to 4. The second change request entry 402 can also represent a change to one of the associated information elements 222, such as changing the phone number to "555-5555".

The second change request entry 402 can represent a potential modification of the burger rating 228 to 4. Because the second change request entry 402 represents a total number of two changes of the burger rating 228 from 5 to 4, the navigation system 100 can elect not verify the change of the burger rating 228 from 5 to 4. The details of verification are described in a later section.

The second change request entry 402 can also represent a potential modification of the phone number 226 to "555-5555". Because the second change request entry 402 represents a total of one change of the phone number 226 to "555-5555", the navigation system 100 can elect not verify the change. The details of verification are described in a later section.

Figure 5:
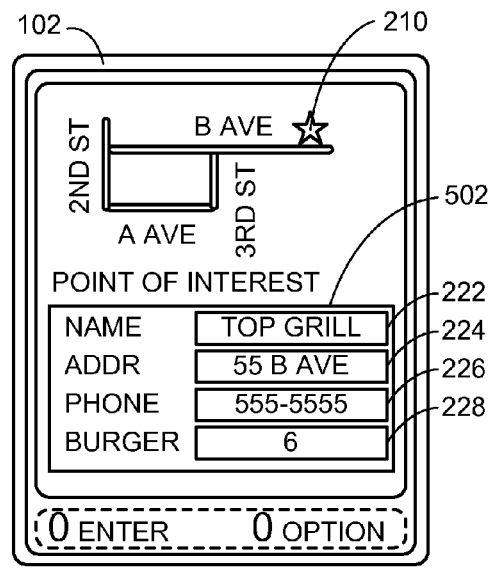
FIG. 5 is a fourth example of the display interface.

Referring now to FIG. 5, therein is shown a fourth example of the display interface 202. The display interface 202 can depict a third change request entry 502 representing a further change to the burger rating 228 to 5. The third change request entry 502 can also represent another change to the phone number 226 to "555-5555".

The third change request entry 502 can represent a second change to the burger rating 228 to 6. Because the third change request entry 502 represents a total of two changes of the burger rating 228 from 5 to 6, the navigation system 100 can verify the change of the burger rating 228 from 5 to 6. The details of verification are described in a later section.

The third change request entry 502 can represent a second change of the phone number 226 to "555-5555". Because the third change request entry 502 represents a total of two changes of the phone number 226 to "555-5555", the navigation system 100 can elect not verify the change. The details of verification are described in a later section.

Figure 6:
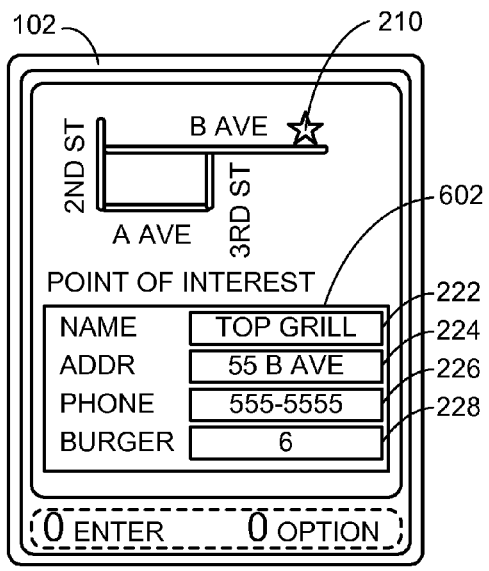
FIG. 6 is a fifth example of the display interface.

Referring now to FIG. 6, therein is shown a fifth example of the display interface 202. The display interface 202 can depict a fourth change request entry 602 representing a change to the burger rating 228 to 6. The fourth change request entry 602 can also represent a change to the phone number 226 to "555-5555".

The fourth change request entry 602 can represent a third change of the burger rating 228 to 6. Because the fourth change request entry 602 represents a total of three changes of the burger rating 228 from 5 to 6, the navigation system 100 with UGC verification can verify the change of the burger rating 228 from 5 to 6. The details of verification are described in a later section.

The fourth change request entry 602 can represent a third change of the phone number 226 to "555-5555". Because the fourth change request entry 602 represents a total of three changes of the phone number 226 to "555-5555", the navigation system 100 can verify the change. The details of verification are described in a later section.

Figure 7:
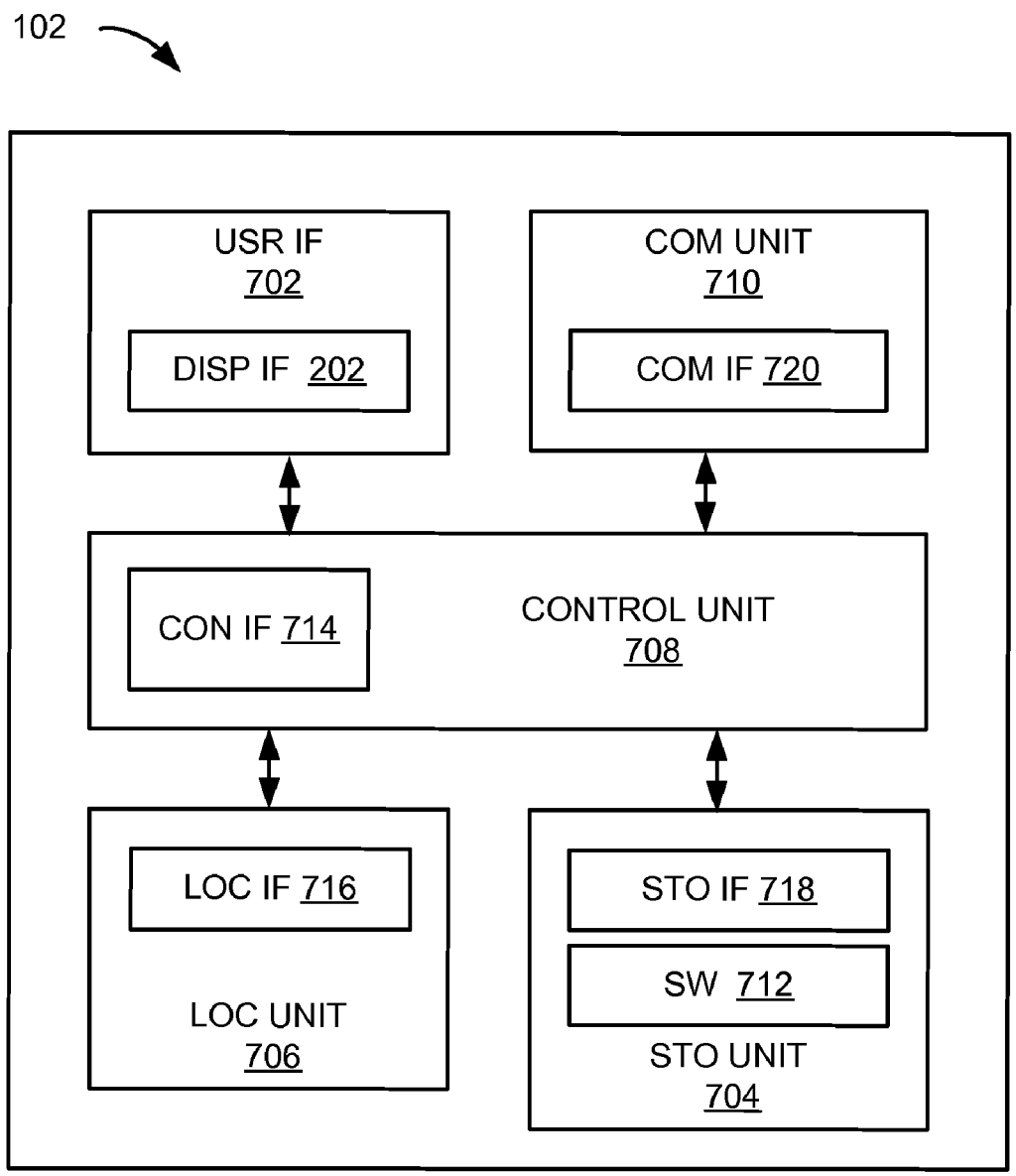
FIG. 7 is an exemplary block diagram of the first device.

Referring now to FIG. 7, therein is shown an exemplary block diagram of the first device 102. The first device 102 can include a user interface 702, a storage unit 704, a location unit 706, a control unit 708, and a communication unit 710.

The user interface 702 allows a user (not shown) to interface and interact with the first device 102. The user interface 702 can include an input device and an output device. Examples of the input device of the user interface 702 can include a keypad, a touchpad, soft-keys, a keyboard, a microphone, or any combination thereof to provide data and communication inputs. Examples of the output device of the user interface 702 can include the display interface 202. The display interface 202 can include a display, a projector, a video screen, a speaker, or any combination thereof.

The control unit 708 can execute a software 712 to provide the intelligence of the navigation system 100. The control unit 708 can operate the user interface 702 to display information generated by the navigation system 100. The control unit 708 can also execute the software 712 for the other functions of the navigation system 100, including receiving location information from the location unit 706. The control unit 708 can further execute the software 712 for interaction with the communication path 104 of FIG. 1 via the communication unit 710.

The control unit 708 can be implemented in a number of different manners. For example, the control unit 708 can be a processor, an embedded processor, a microprocessor, a hardware control logic, a hardware finite state machine (FSM), a digital signal processor (DSP), or a combination thereof.

The control unit 708 can include a controller interface 714. The controller interface 714 can be used for communication between the control unit 708 and other functional units in the first device 102. The controller interface 714 can also be used for communication that is external to the first device 102.

The controller interface 714 can receive information from the other functional units or from external sources, or can transmit information to the other functional units or to external destinations. The external sources and the external destinations refer to sources and destinations external to the first device 102.

The controller interface 714 can be implemented in different ways and can include different implementations depending on which functional units or external units are being interfaced with the controller interface 714. For example, the controller interface 714 can be implemented with a pressure sensor, an inertial sensor, a micro-electromechanical system (MEMS), optical circuitry, waveguides, wireless circuitry, wireline circuitry, or a combination thereof.

The location unit 706 can generate location information, current heading, and current speed of the first device 102, as examples. The location unit 706 can be implemented in many ways. For example, the location unit 706 can function as at least a part of a global positioning system (GPS), an inertial navigation system, a cell-tower location system, a pressure location system, or any combination thereof.

The location unit 706 can include a location interface 716. The location interface 716 can be used for communication between the location unit 706 and other functional units in the first device 102. The location interface 716 can also be used for communication that is external to the first device 102.

The location interface 716 can receive information from the other functional units or from external sources, or can transmit information to the other functional units or to external destinations. The external sources and the external destinations refer to sources and destinations external to the first device 102.

The location interface 716 can include different implementations depending on which functional units or external units are being interfaced with the location unit 706. The location interface 716 can be implemented with technologies and techniques similar to the implementation of the controller interface 714.

The storage unit 704 can store the software 712. The storage unit 704 can also store the relevant information, such as messages, points of interest (POI), navigation routing entries, or any combination thereof.

The storage unit 704 can be a volatile memory, a nonvolatile memory, an internal memory, an external memory, or a combination thereof. For example, the storage unit 704 can be a nonvolatile storage such as non-volatile random access memory (NVRAM), Flash memory, disk storage, or a volatile storage such as static random access memory (SRAM).

The storage unit 704 can include a storage interface 718. The storage interface 718 can be used for communication between the location unit 706 and other functional units in the first device 102. The storage interface 718 can also be used for communication that is external to the first device 102.

The storage interface 718 can receive information from the other functional units or from external sources, or can transmit information to the other functional units or to external destinations. The external sources and the external destinations refer to sources and destinations external to the first device 102.

The storage interface 718 can include different implementations depending on which functional units or external units are being interfaced with the storage unit 704. The storage interface 718 can be implemented with technologies and techniques similar to the implementation of the controller interface 714.

The communication unit 710 can enable external communication to and from the first device 102. For example, the communication unit 710 can permit the first device 102 to communicate with the second device 106 of FIG. 1, an attachment, such as a peripheral device or a computer desktop, and the communication path 104.

The communication unit 710 can also function as a communication hub allowing the first device 102 to function as part of the communication path 104 and not limited to be an end point or terminal unit to the communication path 104. The communication unit 710 can include active and passive components, such as microelectronics or an antenna, for interaction with the communication path 104.

The communication unit 710 can include a communication interface 720. The communication interface 720 can be used for communication between the communication unit 710 and other functional units in the first device 102. The communication interface 720 can receive information from the other functional units or can transmit information to the other functional units.

The communication interface 720 can include different implementations depending on which functional units are being interfaced with the communication unit 710. The communication interface 720 can be implemented with technologies and techniques similar to the implementation of the controller interface 714.

For illustrative purposes, the navigation system 100 is shown with the partition having the user interface 702, the storage unit 704, the location unit 706, the control unit 708, and the communication unit 710 although it is understood that the navigation system 100 can have a different partition. For example, the software 712 can be partitioned differently such that some or all of its function can be in the control unit 708, the location unit 706, and the communication unit 710. Also, the first device 102 can include other functional units not shown in FIG. 7 for clarity.

The functional units in the first device 102 can work individually and independently of the other functional units. The first device 102 can work individually and independently from the second device 106 and the communication path 104.

The navigation system 100 can include the user interface 702 and the control unit 708, coupled to the user interface 702. The navigation system 100 can include the location unit 706 and the control unit 708 coupled to the location unit 706.

The navigation system 100 can include the storage unit 704 coupled to the control unit 708. The navigation system can include the communication unit 710 coupled to the control unit 708.

Figure 8:
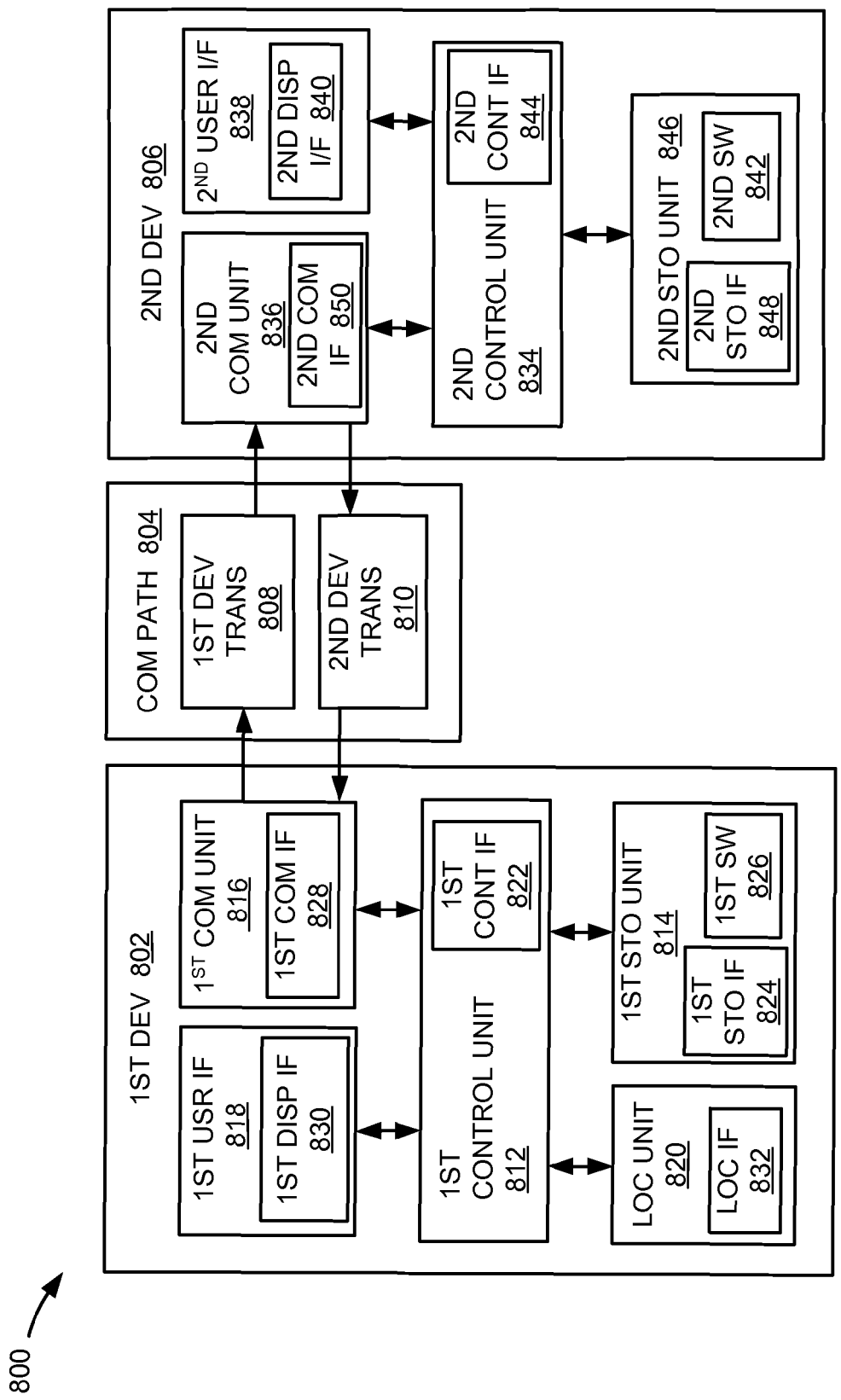
FIG. 8 is an exemplary block diagram of a navigation system in a second embodiment of the present invention.

Referring now to FIG. 8, therein is shown an exemplary block diagram of a navigation system 800 in a second embodiment of the present invention. The navigation system 800 can include a first device 802, a communication path 804, and a second device 806.

The first device 802 can communicate with the second device 806 over the communication path 804. For example, the first device 802, the communication path 804, and the second device 806 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 800.

The first device 802 can send information in a first device transmission 808 over the communication path 804 to the second device 806. The second device 806 can send information in a second device transmission 810 over the communication path 804 to the first device 802.

For illustrative purposes, the navigation system 800 is shown with the first device 802 as a client device, although it is understood that the navigation system 800 can have the first device 802 as a different type of device. For example, the first device 802 can be a server.

Also for illustrative purposes, the navigation system 800 is shown with the second device 806 as a server, although it is understood that the navigation system 800 can have the second device 806 as a different type of device. For example, the second device 806 can be a client device.

For brevity of description in this embodiment of the present invention, the first device 802 will be described as a client device and the second device 806 will be described as a server device. The present invention is not limited to this selection for the type of devices. The selection is an example of the present invention.

The first device 802 can include a first control unit 812, a first storage unit 814, a first communication unit 816, a first user interface 818, and a location unit 820. The first device 802 can be similarly described by the first device 102.

The first control unit 812 can include a first control interface 822. The first control unit 812 and the first control interface 822 can be similarly described as the control unit 708 of FIG. 7 and the controller interface 714 of FIG. 7, respectively.

The first storage unit 814 can include a first storage interface 824. The first storage unit 814 and the first storage interface 824 can be similarly described as the storage unit 704 of FIG. 7 and the storage interface 718 of FIG. 7, respectively. A first software 826 can be stored in the first storage unit 814.

The first communication unit 816 can include a first communication interface 828. The first communication unit 816 and the first communication interface 828 can be similarly described as the communication unit 710 of FIG. 7 and the communication interface 720 of FIG. 7, respectively.

The first user interface 818 can include a first display interface 830. The first user interface 818 and the first display interface 830 can be similarly described as the user interface 702 of FIG. 7 and the display interface 202 of FIG. 7, respectively.

The location unit 820 can include a location interface 832. The location unit 820 and the location interface 832 can be similarly described as the location unit 706 of FIG. 7 and the location interface 716 of FIG. 7, respectively.

The performance, architectures, and type of technologies can also differ between the first device 102 and the first device 802. For example, the first device 102 can function as a single device embodiment of the present invention and can have a higher performance than the first device 802. The first device 802 can be similarly optimized for a multiple device embodiment of the present invention.

For example, the first device 102 can have a higher performance with increased processing power in the control unit 708 compared to the first control unit 812. The storage unit 704 can provide higher storage capacity and access time compared to the first storage unit 814.

Also for example, the first device 802 can be optimized to provide increased communication performance in the first communication unit 816 compared to the communication unit 710. The first storage unit 814 can be sized smaller compared to the storage unit 704. The first software 826 can be smaller than the software 712 of FIG. 7.

The second device 806 can be optimized for implementing the present invention in a multiple device embodiment with the first device 802. The second device 806 can provide the additional or higher performance processing power compared to the first device 802. The second device 806 can include a second control unit 834, a second communication unit 836, and a second user interface 838.

The second user interface 838 allows a user (not shown) to interface and interact with the second device 806. The second user interface 838 can include an input device and an output device. Examples of the input device of the second user interface 838 can include a keypad, a touchpad, soft-keys, a keyboard, a microphone, or any combination thereof to provide data and communication inputs. Examples of the output device of the second user interface 838 can include a second display interface 840. The second display interface 840 can include a display, a projector, a video screen, a speaker, or any combination thereof.

The second control unit 834 can execute a second software 842 to provide the intelligence of the second device 106 of the navigation system 800. The second software 842 can operate in conjunction with the first software 826. The second control unit 834 can provide additional performance compared to the first control unit 812 or the control unit 708.

The second control unit 834 can operate the second user interface 838 to display information. The second control unit 834 can also execute the second software 842 for the other functions of the navigation system 800, including operating the second communication unit 836 to communicate with the first device 802 over the communication path 804.

The second control unit 834 can be implemented in a number of different manners. For example, the second control unit 834 can be a processor, an embedded processor, a microprocessor, a hardware control logic, a hardware finite state machine (FSM), a digital signal processor (DSP), or a combination thereof.

The second control unit 834 can include a second controller interface 844. The second controller interface 844 can be used for communication between the second control unit 834 and other functional units in the second device 806. The second controller interface 844 can also be used for communication that is external to the second device 806.

The second controller interface 844 can receive information from the other functional units or from external sources, or can transmit information to the other functional units or to external destinations. The external sources and the external destinations refer to sources and destinations external to the second device 806.

The second controller interface 844 can be implemented in different ways and can include different implementations depending on which functional units or external units are being interfaced with the second controller interface 844. For example, the second controller interface 844 can be implemented with a pressure sensor, an inertial sensor, a microelectromechanical system (MEMS), optical circuitry, waveguides, wireless circuitry, wireline circuitry, or a combination thereof.

A second storage unit 846 can store the second software 842. The second storage unit 846 can also store the relevant information, such as messages, points of interest (POI), navigation routing entries, or any combination thereof. The second storage unit 846 can be sized to provide the additional storage capacity to supplement the first storage unit 814.

For illustrative purposes, the second storage unit 846 is shown as a single element, although it is understood that the second storage unit 846 can be a distribution of storage elements. Also for illustrative purposes, the navigation system 800 is shown with the second storage unit 846 as a single hierarchy storage system, although it is understood that the navigation system 800 can have the second storage unit 846 in a different configuration. For example, the second storage unit 846 can be formed with different storage technologies forming a memory hierarchal system including different levels of caching, main memory, rotating media, or off-line storage.

The second storage unit 846 can be a volatile memory, a nonvolatile memory, an internal memory, an external memory, or a combination thereof. For example, the second storage unit 846 can be a nonvolatile storage such as nonvolatile random access memory (NVRAM), Flash memory, disk storage, or a volatile storage such as static random access memory (SRAM).

The second storage unit 846 can include a second storage interface 848. The second storage interface 848 can be used for communication between the location unit 706 and other functional units in the second device 806. The second storage interface 848 can also be used for communication that is external to the second device 806.

The second storage interface 848 can receive information from the other functional units or from external sources, or can transmit information to the other functional units or to external destinations. The external sources and the external destinations refer to sources and destinations external to the second device 806.

The second storage interface 848 can include different implementations depending on which functional units or external units are being interfaced with the second storage unit 846. The second storage interface 848 can be implemented with technologies and techniques similar to the implementation of the second controller interface 844.

The second communication unit 836 can enable external communication to and from the second device 806. For example, the second communication unit 836 can permit the second device 806 to communicate with the first device 802 over the communication path 804.

The second communication unit 836 can also function as a communication hub allowing the second device 806 to function as part of the communication path 804 and not limited to be an end point or terminal unit to the communication path 804. The second communication unit 836 can include active and passive components, such as microelectronics or an antenna, for interaction with the communication path 804.

The second communication unit 836 can include a second communication interface 850. The second communication interface 850 can be used for communication between the second communication unit 836 and other functional units in the second device 806. The second communication interface 850 can receive information from the other functional units or can transmit information to the other functional units.

The second communication interface 850 can include different implementations depending on which functional units are being interfaced with the second communication unit 836. The second communication interface 850 can be implemented with technologies and techniques similar to the implementation of the second controller interface 844.

The first communication unit 816 can couple with the communication path 804 to send information to the second device 806 in the first device transmission 808. The second device 806 can receive information in the second communication unit 836 from the first device transmission 808 of the communication path 804.

The second communication unit 836 can couple with the communication path 804 to send information to the first device 802 in the second device transmission 810. The first device 802 can receive information in the first communication unit 816 from the second device transmission 810 of the communication path 804. The navigation system 800 can be executed by the first control unit 812, the second control unit 834, or a combination thereof.

For illustrative purposes, the second device 106 is shown with the partition having the second user interface 838, the second storage unit 846, the second control unit 834, and the second communication unit 836, although it is understood that the second device 106 can have a different partition. For example, the second software 842 can be partitioned differently such that some or all of its function can be in the second control unit 834 and the second communication unit 836. Also, the second device 806 can include other functional units not shown in FIG. 8 for clarity.

The functional units in the first device 802 can work individually and independently of the other functional units. The first device 802 can work individually and independently from the second device 806 and the communication path 804.

The functional units in the second device 806 can work individually and independently of the other functional units. The second device 806 can work individually and independently from the first device 802 and the communication path 804.

For illustrative purposes, the navigation system 800 is described by operation of the first device 802 and the second device 806. It is understood that the first device 802 and the second device 806 can operate any of the modules and functions of the navigation system 800. For example, the first device 802 is described to operate the location unit 820, although it is understood that the second device 806 can also operate the location unit 820.

Figure 9:
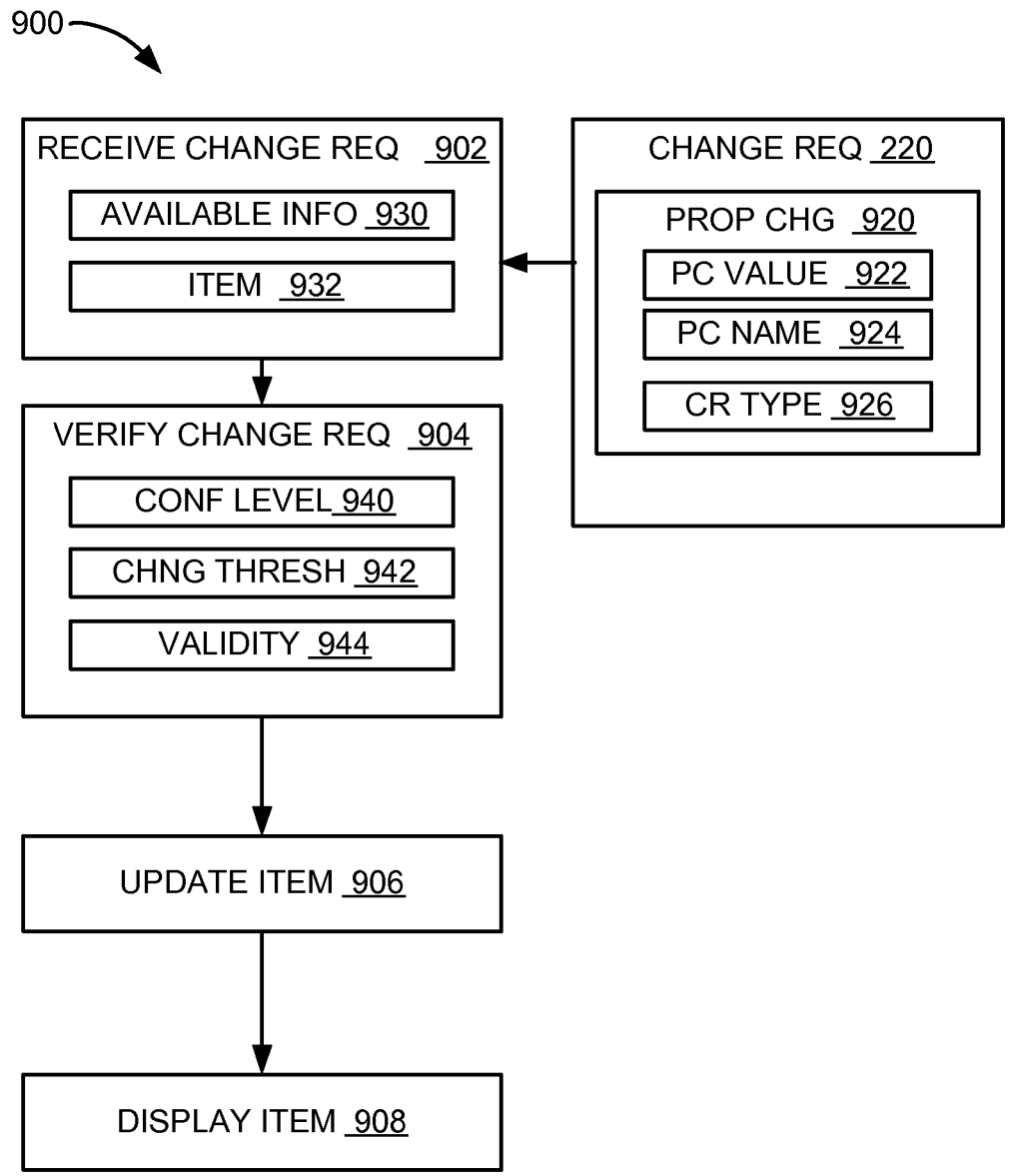
FIG. 9 is a navigation system in a third embodiment of the present invention.

Referring now to FIG. 9, therein is shown a navigation system 900 in a third embodiment of the present invention. The navigation system 900 can facilitate the navigation to a location, such as a point of interest, and operate the display interface 202 of FIG. 2 by presenting navigation information for the point of interest. The navigation system 900 can be used to enter and update user generated content including a proposed change 920 about the point of interest 210 of FIG. 2.

The navigation system 900 can be operated in several different ways. For example, the navigation system 900 can be included in and operated by running the software 712 of FIG. 7. As another example, the navigation system 900 can be partitioned between in and operated by running the first software 826 of FIG. 8, the second software 842 of FIG. 8, or a combination thereof.

In the navigation system 900, as an example, each module is indicated by a number and successively higher module numbers follow one another. Control flow can pass from one module to the next higher numbered module unless explicitly otherwise indicated.

The navigation system 900 can receive the change request 220 of FIG. 2 as a user input in a receive change request module 902. The receive change request module 902 can receive the change request 220 when the user enters the change request 220 and starts the process for verifying and updating a particular piece of information about an item 932. After the change request 220 has been successfully received, the control flow can be transferred to a verify change request module 904.

The change request 220 can represent the proposed change 920 to revise a target element 930 of the item 932. The proposed change 920 can consist of the name of an element of the item 932 to change and a proposed new value for that element. Receiving the change request 220 can include the selection of the item 932 and the entry of the change request 220 as an input from the user.

For example, a user can select the item 932 representing the point of interest 210 of FIG. 2 from the item list 216 of FIG. 2. When the item list 216 is displayed, the user can select the point of interest 210 that is desired by highlighting the item 932 in the item list 216. The user can then enter the change request 220 for the proposed change 920 of the item 932. The receive change request module 902 can preparing the change request 220 for further processing that will be described later in this section.

In another example, the change request 220 can include the proposed change 920 of the item 932 which can include a change in rating for a hamburger from 5 to 6 for the restaurant represented by the item 932. In yet another example, the change request 220 can represent a revision in the phone number from "555-1212" to "555-5555" of the entity represented by the item 932.

The item 932 can represent an entity that has the target element 930 that can be changed. For example, the item 932 with the target element 930 can include a point of interest with a geographical coordinate, a scenic location with a description, a restaurant with a burger rating, a landmark with directions, a store with opening hours, or any combination thereof. The target element 930 can be associated with the item 932, such as an address of a restaurant, the geographical coordinates of a location, the rating of a burger at the restaurant, or any combination thereof.

The proposed change 920 of the change request 220 can represent the name and value for the target element 930 of the item 932 that the user wants to change. The proposed change 920 can include a proposed change name 924 and a proposed change value 922.

The proposed change name 924 is the text that describes the proposed change 920. For example, the proposed change name 924 for the item 932 representing a restaurant can include "burger rating", "address", "phone", or any combination thereof.

The proposed change value 922 can represent the text that describes the proposed change 920. For example, the proposed change value 922 for the item 932 representing a restaurant can include "6", "555 B Street", "(800) 555-5555", or any combination thereof.

For example, the proposed change 920 of the change request 220 can represent the case where the user wants to change of the burger rating of a restaurant to 6. The item 932 can represent the restaurant, the proposed change name 924 can be "burger rating" and can represent the name of what is to be changed The proposed change value 922 can be "6" and can represent the value for the proposed change 920.

The target element 930 of the item 932 can represent the existing information that is associated with the item 932. The target element 930 can include a target element name 1012 and a target element value 1010. The target element 930 of the item 932 can represent the sub-elements or properties of the item 932. For example, the item 932 representing a restaurant can include the target element 930 such as name, address, phone, burger rating, hot dog rating, drink rating, or any combination thereof.

The target element name 1012 is the text that describes the target element 930. For example, the target element name 1012 for the item 932 representing a hotel can include "room rating", "conference rating", or any combination thereof.

The target element value 1010 is the current value for the target element 930 of the target element 930. For example, the target element value 1010 for the target element name 1012 of "room rating" can be 9.

The navigation system 900 can verify a validity 944 of the change request 220 in the verify change request module 904. The validity 944 of the change request 220 that has been verified indicates that the change request 220 is considered correct. The validity 944 is verified by calculating a confidence level 940 of the change request 220.

If the change request 220 is verified, then the validity 944 of the change request 220 can be set to "true". If the change request 220 is not verified, then the validity 944 of the change request 220 can be set to "false".

The verify change request module 904 can verify the validity 944 of the change request 220 based on the confidence level 940 meeting or exceeding a change threshold 942. The confidence level 940 can be calculated using a variety of methods. A more detailed description of the functionality of the verify change request module 904 is provided later.

The confidence level 940 of the change request 220 can indicate the likelihood that the proposed change 920 is correct. For example, the confidence level 940 can be calculated as the cumulative number of times that the change request 220 that is equivalent has been received. The first time the change request 220 representing a change in burger rating to 6 is received, total number of identical change requests is one. The next time the change request 220 representing a change in burger rating to 6 is received, the total number of identical change request is incremented to two. This would indicate that the confidence level 940 of the change request 220 is two.

In another example, the change request 220 can be made by a user with a user status 1040 of ten. The confidence level 940 can be established by the user status 1040, such as a trusted user, an administrator of the navigation system 100, or a law enforcement official. The confidence level 940 can be calculated such that the weight of the change request 220 can be multiplied by the user status 1040 of 10 resulting in a weighted value that is a factor of ten higher. If the confidence level 940 of the change request 220 meets or exceeds the change threshold 942, then the change request 220 would be verified as validated.

The change threshold 942 can represent magnitude of the confidence level 940 required for the change request 220 to be considered valid. The confidence level 940 can be compared against the change threshold 942 to determine if the confidence level 940 is sufficient to verify that the change request 220 is valid.

The change threshold 942 can vary based on a change request type 926 of the change request 220. The change request type 926 can describe the importance of the target element 930 being addressed by the change request 220. The change request type 926 can represent a range of values from a simple change, requiring only the change threshold 942 of 1, to a significant change, requiring the change threshold 942 have a higher value, say 10 or more, to signify a valid change.

The target element 930 with a higher level of importance can require the change threshold 942 to be higher. The change request type 926 can indicate if the proposed change 920 represents a simple change, such as a change in burger rating, or a more substantial change, such as the change of an address or telephone number.

For example, the change threshold 942 for the rating of a burger can be set to a value such as two. If the change request 220 has the confidence level 940 of two or higher, then the change request 220 would be considered valid and the rating of the burger can be updated and changed to the new rating.

In another example, the change threshold 942 for the address of a restaurant can be set to a value such as ten. This would indicate that a higher level of the confidence level 940 for the change request 220 would be required to validate the change compared to the burger rating example. This could be represented by the situation where the change request 220 to change the address has been received by the navigation system 900 ten times.

The validity 944 of the change request 220 confirms that the proposed change 920 is considered correct. The validity 944 of the change request 220 can be determined by comparing the confidence level 940 to the change threshold 942. If the confidence level 940 of the change request 220 meets or exceeds the change threshold 942, then the validity 944 of the change request 220 is verified to be correct or true.

It has been discovered that the present invention provides the navigation system 900 with user generated content mechanism for improving the accuracy of changes and updates by verifying the correctness of user generated content. The navigation system 900 or the verify change request module 904 can increase the accuracy of verifying the validity 944 of the change request 220 by using varying the change threshold 942. This allowed a higher level of reinforcement for changes to information that is changed infrequently, such as an address or telephone number.

The navigation system 900 can update the item 932 in an update item module 906. If the change request 220 has been verified, then the proposed change 920 from the change request 220 is stored and replaces the target element 930 of the item 932.

Updating the target element 930 of the item 932 replaces the target element 930 of the item 932 with the proposed change 920, if the validity 944 of the change request 220 has been verified. When the item 932 has been updated, the target element 930 can be shared with other users of the navigation system 900.

For example, the change request 220 represents a change of the burger rating at the restaurant from 5 to 6. If the change request 220 is verified, the target element 930 for the burger rating of 5 is replaced by an entry for 6. Once updated, the target element 930 for the burger rating will be 6 and the information will be available to all users.

The navigation system 900 can display the information about the item 932 in a display item module 908. When the item 932 is selected by the user, the target element 930 of the item 932 is presented on the display interface 202 of FIG. 2. Displaying the information can enable the user of the navigation system 900 to make a decision to navigate to the location represented by the item 932.

For example, the navigation system 900 can display the burger rating of 6 for the restaurant represented by the item 932. If the burger rating is acceptable to the user, then the user can select that location and the navigation system 900 can calculate a route to the restaurant location. The user can operate the navigation system 900 and physically navigate to the restaurant.

The navigation system 900 can be implemented with the navigation system 100 of FIG. 7. Each module of the navigation system 900 can be implemented using a combination of functional modules of the first device 102 of FIG. 7. For example, the navigation system 900 can be implemented by running the software 712 of FIG. 7 on the control unit 708 of FIG. 7.

The receive change request module 902 can be implemented with the first device 102 of FIG. 1. The receive change request module 902 can be implemented with the user interface 702 of FIG. 7, the control unit 708, the software 712, or a combination thereof.

For example, the navigation system 900 can receive the change request 220 entered by the user on the user interface 702. The user can select the item 932 from the item list 216 that is displayed on the user interface 702 and then enter the change request 220 for the item 932 that was selected from the item list 216.

The verify change request module 904 can be implemented with the first device 102. The verify change request module 904 can be implemented with the control unit 708, the software 712, the storage unit 704 of FIG. 7, or a combination thereof.

For example, the control unit 708 can verify the change request 220 based on the validity 944 of the change request 220. The control unit 708 can calculate the confidence level 940 and compare it to the change threshold 942.

The update item module 906 can be implemented with the first device 102. The update item module 906 can be implemented with the control unit 708, the software 712, the storage unit 704, or a combination thereof. For example, the control unit 708 can update the target element 930 of the item 932 in the storage unit 704 with the proposed change 920 of the change request 220.

The display item module 908 can be implemented with the first device 102. The display item module 908 can be implemented with the control unit 708, the software 712, the storage unit 704, the user interface 702, or a combination thereof. For example, the control unit 708, running the software 712, can display the item 932 on the display interface 202 of FIG. 2 of the user interface 702. The user can view the item 932 on the display interface 202 and decide to navigate to that location.

The navigation system 900 can be implemented with the navigation system 800 of FIG. 8. Each module of the navigation system 900 can be implemented using a combination of functional modules of the first device 802 of FIG. 8 and the second device 806 of FIG. 8. For example, the navigation system 900 can be implemented by running the first software 826 of FIG. 8 on the first control unit 812 of FIG. 8 and the second software 842 of FIG. 8 on the second control unit 834 of FIG. 8.

The receive change request module 902 can be implemented with the navigation system 800 of FIG. 8. The receive change request module 902 can be implemented with the first user interface 818 of FIG. 8, the first control unit 812, the first software 826, the second user interface 838, the second control unit 834, and the second software 842, or any combination thereof.

For example, the navigation system 900 can receive the change request 220 entered by the user on the first user interface 818. The user can select the item 932 from the item list 216 that is displayed on the first user interface 818.

The verify change request module 904 can be implemented with the navigation system 800. The verify change request module 904 can be implemented with the first control unit 812, the first software 826, the first storage unit 814 of FIG. 8, the second control unit 834, the second software 842, the second storage unit 846 of FIG. 8, or any combination thereof.

For example, the second control unit 834 running the second software 842 can verify the validity 944 of the change request 220. The second control unit 834 can calculate the confidence level 940 and compare it to the change threshold 942.

The update item module 906 can be implemented with the navigation system 800. The update item module 906 can be implemented with the first control unit 812, the first software 826, the first storage unit 814, the second control unit 834, the second software 842, the second storage unit 846, or any combination thereof. For example, the second control unit 834 running the second software 842 can update the target element 930 of the item 932 in the second storage unit 846 with the proposed change 920 of the change request 220.

The display item module 908 can be implemented with the navigation system 800. The display item module 908 can be implemented with the first user interface 818, the first control unit 812, the first software 826, the first storage unit 814, the first communication unit 816 of FIG. 8, the second control unit 834, the second software 842, the second storage unit 846, the second communication unit 836 of FIG. 8, or any combination thereof.

For example, the first control unit 812 running the first software 826 can display the item 932 on the display interface 202 of FIG. 2 of the first user interface 818. The user can view the item 932 on the display interface 202 and decide to navigate to that location.

It has also been discovered that the present invention provides the navigation system 900 with user generated content mechanism for improving performance, increasing reliability, and reducing cost. The navigation system 900 can verify the validity 944 of the change request 220 for user generated content, allowing faster updates to high volume of the user generated content at a lower cost. In addition, using multiple instances of the change request 220 increases reliability by using mutual reinforcement between the various numbers of the change request 220 to insure that the changes are correct.

The physical transformation of the change request 220 of the item 932 of user generated content can result in movement in the physical world, such as people or vehicles using the first device 102 of FIG. 1, based on the operation of the navigation system 100 to navigate to the point of interest represented by the item 932 with users having assurance that the posted user generated content has been verified. As the movement in the physical world occurs, the movement itself creates additional information that is converted back to the user generated content as the change request 220 for the continued operation of the navigation system 100 with UGC verification and to continue the movement in the physical world. The verification of user generated content, such as a menu item rating, can enable to the user to decide to navigate to the point of interest.

The navigation system 900 describes the module functions or order as an example. The modules can be partitioned differently. For example, the verify change request module 904 can be performed by executing the software 712 of FIG. 7 with the control unit 708 of FIG. 7 in a single device configuration or by executing the first software 826 of FIG. 8 with the first control unit 812 of FIG. 8 and executing the second software 842 of FIG. 8 on the second control unit 834 of FIG. 8 in a two device configuration. Each of the modules can operate individually and independently of the other modules.

The navigation system 900 can be partitioned between the first device 802 of FIG. 8 and the second device 806 of FIG. 8. For example, the navigation system 900 can be partition into the functional units of the first device 802, the second device 806, or a combination thereof. The navigation system 900 can also be implemented as additional functional units in the first device 102 of FIG. 1, the first device 802, the second device 806, or a combination thereof.

Figure 10:
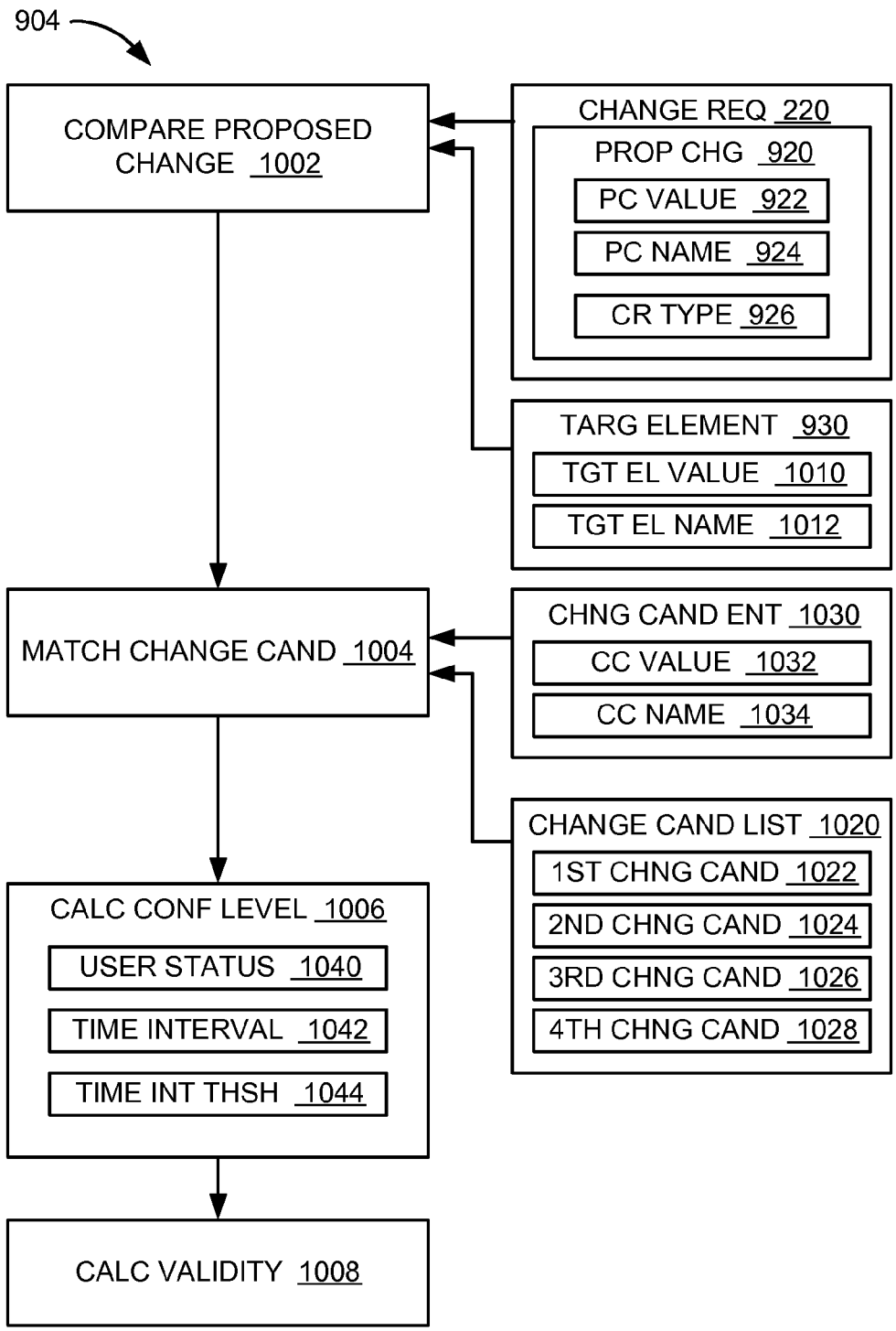
FIG. 10 is a detailed diagram of the verify change request module.

Referring now to FIG. 10, therein is shown a detailed diagram of the verify change request module 904. The verify change request module 904 can determine if the change request 220 represents a valid change to the target element 930 of the item 932. This can include calculating the validity 944 of the change request 220 that can be used in the update item module 906 of FIG. 9.

The verify change request module 904 can include a compare proposed change module 1002. The compare proposed change module 1002 can determine if the change request 220 represents an update to existing information about the item 932 or if it represents a new piece of information of the item 932. If the proposed change name 924 of the change request 220 matches The proposed change 920 of the change request 220 is compared to the target element 930 of the item 932 by matching the proposed change name 924 to the target element name 1012 of the item 932. Although a singular the target element name 1012 is described, it is understood that the item 932 may possess multiple entries of the target element 930.

The proposed change name 924 and the target element name 1012 can be matched using a variety of methods. For example, the matching can include an exact match, an approximate match, or any combination thereof.

An exact match can require that the proposed change name 924 is character for character the same as the target element name 1012. Exact matching can also allow a match in cases where there are minor differences such as additional whitespace, capitalization mismatches, spacing differences, character set differences, abbreviations, acronyms, slang, or any combination thereof.

An approximate match can allow the proposed change name 924 to match to the target element name 1012 when the names are similar. The approximate match can be calculated in a variety of methods such as keyword matching, statistical matching of the characters of the names, keyword substitution, calculation of a matching function, or any combination thereof. The approximate matching can also include translation from different languages.

If the proposed change name 924 of the change request 220 matches the target element name 1012 of the item 932, then the change request 220 represents a potential modification to the target element 930 of the item 932. Control can pass to a match change candidate module 1004.

If the proposed change name 924 of the change request 220 does not match the target element 930 of the item 932, then the change request 220 can become a new or different entry on a change candidate list 1020 of the item 932. The change candidate list 1020 is a list of potential modifications to the target element 930 of the item 932 that have not been verified.

The change candidate list 1020 can include a first change candidate 1022 that represents the change request 220 that did not match the target element 930 of the item 932. The potential modification to the target element 930 of the item 932 can represent the creation of a new the target element 930 of the item 932. Control can then pass to the update item module 906 of FIG. 9.

For example, if the proposed change name 924 is "burger rating" and the item 932 includes the target element name 1012 of "burger rating", then the proposed change 920 matches the target element 930. The change request 220 represents a potential modification to the target element 930 and control can pass to the match change candidate module 1004.

In a further example, if the proposed change name 924 is "onion ring rating" and there is no the target element 930 with the target element name 1012 of "onion ring rating", then the change request 220 does not match. The change request 220 can become the first change candidate 1022 on the change candidate list 1020 of the item 932. The first change candidate 1022 can be created with the target element name 1012 set to the proposed change name 924 "onion ring rating" and the target element value 1010 set to the proposed change value 922. Control can pass to the match change candidate module 1004.

The navigation system 900 can include the match change candidate module 1004. The match change candidate module 1004 can determine if the change request 220 is equivalent to a change candidate entry 1030 in the change candidate list 1020 for the item 932. The change candidate list 1020 can represent the previous potential modifications that have not been verified. The change candidate entry 1030 can represent the change request 220 that was not previously verified.

The change request 220 can match the change candidate entry 1030 of the change candidate list 1020 if the name and value of the proposed change 920 of the change request 220 match the name and value of the change candidate entry 1030. The proposed change name 924 can be compared to a change candidate name 1034 to see if they match. The proposed change value 922 can be compared to a change candidate value 1032 to see if they match. Matching both name and value for the proposed change 920 to the name and value for the change candidate entry 1030 can indicate that the change request 220 matches the change candidate entry 1030. The matching process can continue until all entries in the change candidate list 1020 have been compared to the change request 220.

The change candidate name 1034 is the text that describes the change candidate entry 1030. For example, the change candidate name 1034 for the item 932 representing a restaurant can include "burger rating", "address", "phone", or any combination thereof.

The change candidate value 1032 is the value that describes the change candidate entry 1030. For example, the change candidate value 1032 for the item 932 representing a restaurant can include "6", "555 B Street", 555-5555", or any combination thereof.

If the change request 220 does not match the change candidate entry 1030 of the change candidate list 1020, then the change request 220 can become identified as a new entry on the change candidate list 1020 of the item 932. The change candidate list 1020 can include a second change candidate 1024 that represents the potential modification of the change request 220. The second change candidate 1024 can include the proposed change name 924 and the proposed change value 922 of the change request 220. Control can pass to the update item module 906 of FIG. 9.

If the change request 220 matches the change candidate entry 1030, then the change request 220 can represent another potential modification to the target element 930 of the item 932. Control can pass to a calculate confidence level module 1006.

For example, the change request 220 with the proposed change name 924 of "burger rating" and the proposed change value 922 of "6" can be compared to the change candidate entry 1030 of the change candidate list 1020. If the change candidate name 1034 is "burger rating", but the change candidate value is "5.5", then the change request 220 will not match the change candidate entry 1030 and the next entry in the change candidate list 1020 can be tested.

If the change request 220 does not match any of the entries in the change candidate list 1020, then the change request 220 does not match and the change request 220 can become the change candidate entry 1030 with change candidate name "burger rating" and the change candidate value of "6".

In another example, the change request 220 with the proposed change name 924 of "burger rating" and the proposed change value 922 of "6" can be compared to the change candidate entry 1030 of the change candidate list 1020. If the change candidate name 1034 is "burger rating" and the change candidate value is "6", then the change request 220 can match the change candidate entry 1030. If a match is identified, then control can pass to the update item module 906 of FIG. 9.

The navigation system 900 can include the calculate confidence level module 1006. The calculate confidence level module 1006 can determine the confidence level 940 of the change request 220 based on the number of previous matching changes.

The confidence level 940 of the change request 220 can indicate the likelihood that the proposed change 920 of the change request 220 is correct. The confidence level 940 can be calculated using a variety of methods.

For example, the confidence level 940 can be calculated as the cumulative number of times that the change candidate entry 1030 has been received. The first time the change request 220 representing a change in burger rating to 6 is received, the total number of the change candidate entry 1030 is one. The next time the change request 220 representing a change in burger rating to 6 is received, the total number of the change candidate entry 1030 is incremented to two.

In another example, the confidence level 940 can be calculated as the sum of weighted values where the change request 220 has a weighing value determined by the user status 1040 of the user making the change request 220. The user status 1040 can allow some users to have a greater effect when they make the change request 220. Users with the user status 1040 that is considered "high" can include power users, administrators, moderators, subscribed users, users with a history of accurate actions, or any combination thereof.

In yet another example, the confidence level 940 can be calculated as the sum of weighted values where the change request 220 has a weighted value determined by a time interval 1042 between the change request 220 and the change candidate entry 1030 being at or below a time interval threshold 1044. Calculating the confidence level 940 based on the time interval 1042 can allow the change request 220 to have a greater effect on the confidence level 940 if it closely follows the change candidate entry 1030 in time.

The time interval threshold 1044 can represent an amount of time where two equivalent changes made one after another would not increase the likelihood that the change was correct. If the change request 220 is made before the time interval threshold 1044 expires, then there is a higher likelihood that the change request 220 is valid.

If the time interval 1042 between the change request 220 and the change candidate entry 1030 is 10 minutes and the time interval threshold 1044 is 30 minutes, then the weighted value for the change request 220 can be set to 100. If the time interval 1042 between the change request 220 and the change candidate entry 1030 is 40 minutes and the time interval threshold 1044 is 30 minutes, then the weighted value for the change request 220 can be set to 0. Thus, the confidence level 940 can be calculated by summing up the weighed values and result in a more likely change when the change request 220 occurs at or before the time interval threshold 1044.

It has been discovered that the present invention provides the navigation system 900 with user generated content mechanism for improved flexibility. The calculate confidence level module 1006 provides the improved flexibility by using a variety of methods to calculate the confidence level 940. By calculating the confidence level 940 using a variety of methods, the navigation system 900 can determine the validity 944 of the change request 220 for the item 932 and verify the user generated content in the real world.

The navigation system 900 can include a calculate validity module 1008. The calculate validity module 1008 can determine if the change request 220 is valid by comparing the confidence level 940 of the change request 220 to the change threshold 942.

The validity 944 of the change request 220 can be calculated by comparing the confidence level 940 of the change request 220 to the change threshold 942. If the confidence level 940 meets or exceeds the change threshold 942, then the change request 220 is considered valid and the validity 944 is set to "true".

If the confidence level 940 is below the change threshold 942, then the change request 220 is not considered valid and the validity 944 is set to "false". The change request 220 can become an entry on the change candidate list 1020 of the item 932. The change candidate list 1020 can include a third change candidate 1026 that represents the potential modification to the target element 930 of the item 932. The third change candidate 1026 can include the proposed change name 924 of the change request 220 and the proposed change value 922 of the change request 220. Control can pass to the update item module 906 of FIG. 9.

The change threshold 942 can vary based on the change request type 926 of the change request 220. The change request type 926 can indicate if the proposed change 920 represents a simple change, such as a change in burger rating, or a more substantial change, such as the change of an address or telephone number.

For example, the change threshold 942 for the rating of a burger can be set to a value such as two. If the change request 220 has the confidence level 940 of two or higher, then the change request 220 would be considered valid and the rating of the burger would be updated and set to the new rating.

In another example, the change threshold 942 for the address of a restaurant can be set to a value such as ten. This would indicate that a higher level of the confidence level 940 for the change request 220 would be required to validate the change. This could be represented by the situation where the change request 220 to change the address has been received by the navigation system 900 ten times.

Figure 11:
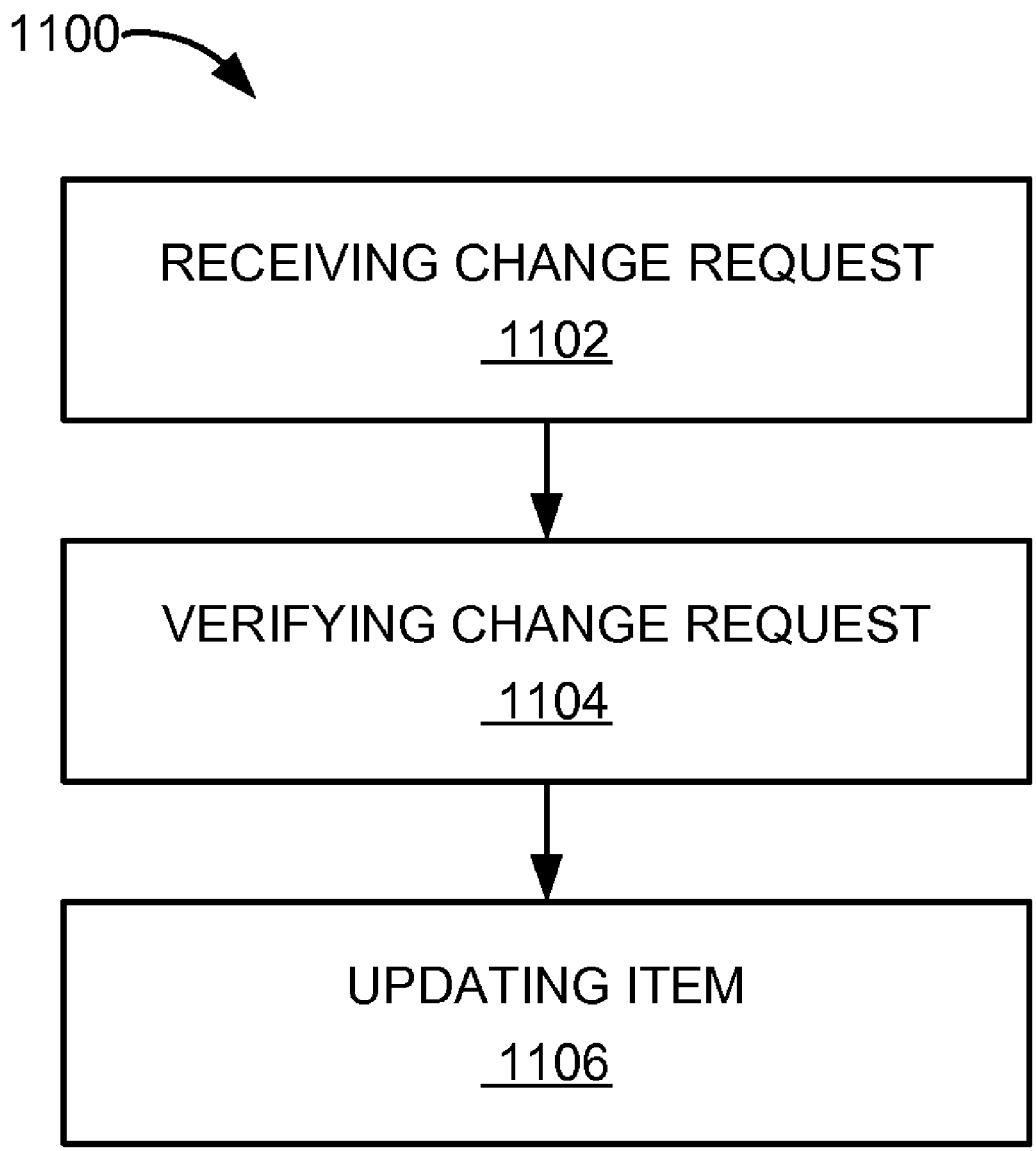
FIG. 11 is a flow chart of a method of operation of a navigation system in a further embodiment of the present invention.

Referring now to FIG. 11, therein is shown a flow chart of a method 1100 of operation of the navigation system 100 in a further embodiment of the present invention. The method 1100 includes receiving a change request with a proposed change for an item in a block 1102; verifying a validity of the change request based on a confidence level meeting or exceeding a change threshold in a block 1104; and updating a target element of the item based on the validity of the proposed change for avoiding an incorrect update to the target element for displaying on a device in a block 1106.

The resulting method and system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving a change request with a proposed change for an item;
   verifying a validity of the change request based on a confidence level meeting or exceeding a change threshold with a control unit;
   updating a target element of the item based on the validity of the proposed change for avoiding an incorrect update to the target element for displaying on a device; and
   wherein:
   verifying the validity of the change request includes calculating the confidence level based on the number of times the change request matches an entry on a change candidate list of the item to correlate with multiple potential modifications.

2. The method as claimed in claim 1 wherein receiving a change request includes selecting the item for the change request from an item list.

3. The method as claimed in claim 1 wherein verifying the validity of the change request based on the confidence level includes calculating the confidence level based on a user's status.

4. The method as claimed in claim 1 wherein verifying the validity the change request based on the change confidence level includes calculating the confidence level based on a time interval between the change request and a change candidate entry meeting or being below a time interval threshold.

5. A method of operation of a navigation system comprising:
   receiving a change request with proposed change for an item;
   verifying a validity of the change request matching a change candidate entry in a change candidate list based on a confidence level meeting or exceeding a change threshold with a control unit;
   updating a target element of the item based on the validity of the proposed change for avoiding an incorrect update to the target element for displaying on a device; and
   wherein:
   verifying the validity of the change request includes calculating the confidence level based on the number of times the change request matches an entry on a change candidate list of the item to correlate with multiple potential modifications.

6. The method as claimed in claim 5 wherein verifying the validity of the change request includes varying the change threshold based on a change request type to differentiate between potential modifications requiring more correlation between multiple changes.

7. The method as claimed in claim 5 further comprising matching the change request to the change candidate entry including:
   matching a proposed change name to a change candidate name; and
   matching a proposed change value to a change candidate value.

8. The method as claimed in claim 5 further comprising matching the change request to the change candidate entry includes identifying the change request as a change candidate entry based on the proposed change name not previously existing in the change candidate list.

9. The method as claimed in claim 5 further comprising matching the change request to the target element of the item includes matching the proposed change name to the target element name based on the exact match of the proposed change name and the target element name.

10. A navigation system comprising:
    a controller interface for receiving a change request;
    a verify change request module, coupled to the controller interface, for verifying the change request of an item based on the validity of the proposed change for avoiding an incorrect update to the target element;

an update item module, coupled to the controller interface, for updating the target element of the item based on the validity of the proposed change for avoiding an incorrect update to the target element; and wherein:

the verify change request module is for calculating the confidence level based on the number of times the change request matches an entry on a change candidate list of the item to correlate with multiple potential modifications.

11. The system as claimed in claim 10 wherein the controller interface is for receiving a change request based on selecting the item for the change request for an item list.

12. The system as claimed in claim 10 wherein the verify change request module is for calculating the confidence level based on the user's status.

13. The system as claimed in claim 10 wherein the verify change request module is for calculating a change confidence level based on a time interval between a change request and a change candidate entry below a time interval threshold.

14. The system as claimed in claim 10 further comprising a match change candidate module, coupled to the controller interface, for matching the change request to the change candidate entry of the change candidate list.

15. The system as claimed in claim 14 wherein the match change candidate module for verifying the validity of the change request includes varying the change threshold based on the change request type to differentiate between changes requiring more correlation between multiple changes.

16. The system as claimed in claim 14 wherein the match change candidate module for matching the change request to the change candidate entry includes:

matching a proposed change name to a change candidate name; and matching a proposed change value to a change candidate value.

17. The system as claimed in claim 14 wherein the match change candidate module is for identifying the change request as a change candidate entry based on the proposed change name not previously existing in the change candidate list.

18. The system as claimed in claim 14 wherein the match change candidate module, coupled to the controller interface, for matching the change request to the target element of the item includes matching the proposed change name to the target element name based on the exact match of the proposed change name and the target element name.

* * * * *